(12) United States Patent
Harrison

(10) Patent No.: US 10,364,971 B2
(45) Date of Patent: Jul. 30, 2019

(54) LIGHT SYSTEM

(71) Applicant: Robert William Harrison, Caledon (CA)

(72) Inventor: Robert William Harrison, Caledon (CA)

( * ) Notice: Subject to any disclaimer, the term of this patent is extended or adjusted under 35 U.S.C. 154(b) by 0 days.

(21) Appl. No.: 15/858,799

(22) Filed: Dec. 29, 2017

(65) Prior Publication Data

US 2018/0178422 A1 Jun. 28, 2018

Related U.S. Application Data

(63) Continuation-in-part of application No. 14/664,315, filed on Mar. 20, 2015.

(51) Int. Cl.
| | |
|---|---|
| *F21V 23/00* | (2015.01) |
| *B29C 45/14* | (2006.01) |
| *B60Q 1/26* | (2006.01) |
| *H05B 37/02* | (2006.01) |
| *F21S 4/22* | (2016.01) |
| *F21V 15/01* | (2006.01) |
| *F21V 29/10* | (2015.01) |
| *F21V 23/04* | (2006.01) |
| *F21Y 115/10* | (2016.01) |
| *B60Q 1/24* | (2006.01) |
| *F21Y 103/10* | (2016.01) |
| *F21S 10/02* | (2006.01) |
| *F21S 10/06* | (2006.01) |
| *H05B 33/08* | (2006.01) |

(52) U.S. Cl.
CPC ............ *F21V 23/001* (2013.01); *B29C 45/14* (2013.01); *B60Q 1/2696* (2013.01); *F21S 4/22* (2016.01); *F21V 15/012* (2013.01); *H05B 37/0245* (2013.01); *B60Q 1/24* (2013.01); *F21S 10/023* (2013.01); *F21S 10/066* (2013.01); *F21V 23/045* (2013.01); *F21V 23/0464* (2013.01); *F21V 29/10* (2015.01); *F21Y 2103/10* (2016.08); *F21Y 2115/10* (2016.08); *H05B 33/0842* (2013.01)

(58) Field of Classification Search
CPC ................ F21Y 2103/10; F21V 23/001; F21S 4/22–4/26; B60Q 1/2696
See application file for complete search history.

(56) References Cited

U.S. PATENT DOCUMENTS

| | | | |
|---|---|---|---|
| 2005/0068770 A1* | 3/2005 | Sloan | F21V 33/006 362/227 |
| 2010/0110678 A1* | 5/2010 | Shen | F21V 3/02 362/235 |
| 2016/0223149 A1* | 8/2016 | Gerpheide | F21L 4/00 |

* cited by examiner

*Primary Examiner* — Sean P Gramling
(74) *Attorney, Agent, or Firm* — S&L US IP Attorneys, P.C.; Timothy Marc Shropshire

(57) ABSTRACT

A light system comprises a moldable housing and at least one light source disposed entirely within the moldable housing. The at least one light source is electrically connected to a power source, wherein the housing is attached to a substrate, and wherein the moldable housing is selectively malleable upon contact with sufficient heat.

16 Claims, 4 Drawing Sheets

LIGHT SYSTEM

CROSS-REFERENCE TO RELATED APPLICATION(S)

The present application claims priority to U.S. Non-Provisional patent application Ser. No. 14/664,315 filed on Mar. 20, 2015, entitled "LINEAR FLEXIBLE LED FIXTURE FOR LIFT TRUCKS" the entire disclosure of which is incorporated by reference herein.

BACKGROUND OF THE INVENTION

Field of Invention

This invention relates to light emitting systems and more particularly to those light emitting systems associated with a vehicle.

Description of Related Art

Selection and application of a lighting system requires consideration of multiple factors regarding the intended use, substrate or application location to which the system is to be installed, and features of the light allowing for use an adaptability. Even higher levels of consideration are required when the lighting system is to be installed on a vehicle for low-light use or safety.

While some lighting systems for vehicle application offer a direct fit engagement between the light structure and the vehicle, other systems provide supplemental light and require structure and functionality to promote adaptable installation.

Where the vehicle is a lift-truck or utility vehicle used to move heavy objects inside or outside of a building, it is important to have proper illumination for the driver and those working in close proximity to the vehicle.

Current light system options are limited in their adaptability and innovation as been stifled by low levels of acceptance for the function of existing light platforms. Some current options involve a single, headlight assembly typically mounted on the front top corners of a lift truck near or on overhead guards. While this may have been a traditional platform for lighting system installation, it fails to provide a high output of efficient lighting. Further, the installation generally requires a mounting plate or prefabricated bracket to mount the light system to.

One drawback, generally, of conventional current light systems is that the beam of light emitted therefrom is reflected harshly from the light truck mast assembly, an integral part of the lift truck that is located between the operators cabin and the intended viewing area. The harsh reflection of light from the mast assembly interferes with the operators vision, causing poor visibility. Door mounted dock-lights also cause the same negative effect on the operator's visibility of focal area, especially when driving the vehicle in reverse.

Light emitting diode (LED) style light systems have improved the size required for the fixtures. LEDs forms small light sources which comprises a two lead semiconductor that emits light when activated. However, the fixture and the installation surface on the vehicle still limit the ultimate capability of the lighting system.

Although linear LED lighting is becoming more popular, they are simply being substituted into traditional lighting platforms in place of filament bulbs.

Such conventional lighting fixtures are relatively large and rigid or static structures, which are positioned to emit light beam from a single point, resulting in restricted applications of such fixtures. Further limiting current lighting systems is their failure to withstand harsher environmental conditions including exposure to water, heat, dust and high-pressure impact.

A separate deficiency directly relates to the mounting requirements of current lighting systems. The mounting of current systems decreases a lift truck user's line of sight by obscuring open areas with the additional mounting structures.

Yet another shortcoming of the current state of the art is the inability for interconnectivity between the light fixtures. Where a user would benefit from multiple fixtures electrically connected to one another, they often require each fixture to be hard-wired to one another.

Based on the foregoing there is a need in the art for a lighting system that will withstand harsh operating conditions and allow for adaptable installation. A lighting system is needed that will allow for application and interconnectivity with improved operation and control of the light emitted.

SUMMARY OF THE INVENTION

A light system comprises a moldable housing and at least one light source disposed entirely within the moldable housing. The at least one light source is electrically connected to a power source, wherein the housing is attached to a substrate, and wherein the moldable housing is selectively malleable upon contact with sufficient heat.

In an embodiment, the system further comprises at least two light sources, wherein a first light source is generally circular and a second light source is positioned around a circumference of the first light source.

In an embodiment, the second light source provide a dynamic display of light.

In an embodiment, the system further comprises at least one controlling unit having a photo resistor sensor and at least one processor disposed therein.

In an embodiment, the system is wirelessly controlled by a remote device.

In an embodiment, the light source displays a light of a predetermined wavelength, wherein the wavelength is selectively modified.

In an embodiment, the moldable housing is molded from a first shape to a second shape, wherein the moldable housing is sufficiently heated and simultaneously molded into a predetermined shape.

In an embodiment, the predetermined shape is defined by one or more contours of the substrate.

In an embodiment, the moldable housing is comprised of a smart alloy, wherein a section of the moldable housing between a first end and a second end is substantially transparent to permit light emitted from the at least one light source to pass through, wherein the smart alloy provides a resilient shape.

In an embodiment, the moldable housing comprises one or more electrical leads, wherein the housing is accepts one or more electrical connections from another moldable housing.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
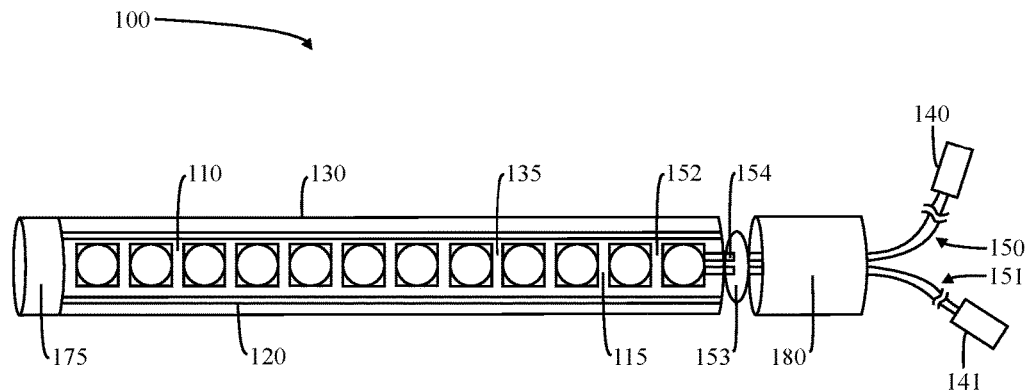
FIG. 1 shows a perspective view of the light system, according to an embodiment of the present invention.

Preferred embodiments of the present invention and their advantages may be understood by referring to FIGS. 1-5, wherein like reference numerals refer to like elements.

A lighting system 100 has a housing 130 with a light producing source 110 disposed therein. The light source 110 is electrically connected to a power source and is selectively operation to adjust at least between an "on" position and an "off" position. The housing 130 is adaptable and configured to be installed on a uniform or irregular surface.

In an embodiment, the light source 110 is flexible. A plurality of light emitting diodes (LEDs) is positioned on a flexible strip disposed entirely within the housing 130. The flexible strip is configured to adapt to the ultimate geometry of the housing 130. For example, where the housing 130 remains in an initial shape, the light strip maintains an original shape. Where the housing 130 is heated and manipulated, the flexible strip within the housing 130 is flexed as required by the adjusted shape of the housing 130.

In a non-limiting example, FIG. 1 illustrates a perspective view of the light system 100, a light source 110 consisting a linear strip of LEDs affixed to a backing support member 120 and positioned within the light system 100. In a specific embodiment, the backing support member 120 comprises a substantially flexible plastic material, adapted to maintain the orientation of the LED strip 110 within the light system 100. The light system 100 has a housing 130, made of a substantially translucent material, which encases the light source 110 fixed onto the backing support member 120.

The housing 130 may be converted from a rigid and static shape to a malleable configuration upon the application of heat. In an embodiment, the housing 130 is a resilient material that is heat activated to an adjustable geometry. When the housing 130 is heated, the material comprising the housing 130 becomes less rigid and more flexible. The increased flexibility directly correlates with the quantity and duration of the heat applied. For example, a heat gun (not shown) is used, and heated air dispersed from the heat gun is directed towards the housing 130. The heated air is applied to the exterior of the housing 130 until the housing 130 is malleable. The malleability allows for the shape and geometry of the housing 130 to be adjusted from an initial position to a desired modified position. As the housing 130 cools from the malleable heated phase, the housing 130 returns to a rigid state in the modified geometry reflecting the flexed shape during the heated phase.

In an embodiment, the material may be a memory-resilient material such as a smart metal or smart alloy allowing for a resilient adaptable configuration including the ability to manipulate the shape of the housing 130, where the housing 130 is made of an alloy. The resilient nature of the material provides for an ability to repeatedly modify the shape of the housing 130 then return the housing 130 to an original position.

In another embodiment, the housing 130 is comprised of a plastic or polymer material. The material is heat-moldable allowing for a structural composition of the material such that the molecular structure is malleable upon heat treatment. For example, the chemical structure of the solid material is modified to an excited state allowing for a structural rearrangement of the material while the material is sufficiently heated. In an embodiment, sufficiently heated refers to a quantity and time or heat energy being applied to the housing 130 until the housing 130 becomes moldable or modifiable. After the heat is removed, the modified shape is retained.

The housing 130 is configured to meet specific requirements for the intended application. The attributes of the housing 130 may include an airtight or waterproof interior. In such an embodiment, the interior of the housing 130, wherein the light source is positioned, is sealed at one or more sides with a cap member 175, 180. The cap member 175, 180 is threadingly engaged with a gasket or adhered to the housing 130 with a non-soluble adhesive.

In a particular and non-limiting embodiment, the housing 130 of the light system 100 is water resistant and water-submergible. In such an embodiment, the interior of the housing 130 will remain dry when the entire light system 100 is submerged.

In another embodiment, the light system 100 has an electrical connector 140, 141 configured to interface the light source 110 with one or more external components (not shown). For example, an external power source (not shown) may be electrically connected to the light source 110 through the electrical connector 140, 141 through electrical leads or wires 150, 151. The electrical connector 140, 141 is configured to allow both positive and negative electrical leads 150, 151 to pass into and out of a same end of the housing, allowing easy and quick installation.

In an embodiment, the housing 130 has one or more light filter layers 152 disposed within or about the exterior of the housing 130. Each of the filter layers 152 is configured to selectively allow transmission or a predetermined wavelength. For example, the filters 152 may be provided to allow for a particular and desired color of light or intensity of light. In a particular embodiment, at least one of the filter layers 152 is used for controlling the harshness of light emitted light source 110. In another embodiment, at least one filter layer 152 is a translucent PVC material, placed within the housing 130 and above the light source 110, such that an output of diffused light that can be obtained.

In an embodiment, the flexible housing 130 comprises a lens 135. The lens 135 is configured to direct and modify a path or direction of the light emitted from the light source 110. For example, wherein the housing 130 is cylindrical, the lens 135 is a pipe having a circumference smaller than that of the housing circumference. While the lens 135 may provide for a material with a different refractive index, the material with which it is comprised is configured to match the static to dynamic shape of the housing 130. For example, the lens 135 may be made of a clear extruded schedule 40 PVC material, with one or more of the following qualities: flexible/arch-able, shatter proof, water-submergible, and shapeable using a heat gun if required. In another embodiment, the lens pipe is made of a substantially translucent material or a frosted type PVC material.

In an alternative embodiment, the light system 100 is chemically welded with the one or more cap 180, lens pipe 130 and end cap 175, as one hermetically sealed unit enclosing the LED strip or ribbon 110, therein.

A plurality of buttons 153 may be manipulated on an exterior of the housing 130. For example, one end of the button 153 extends outward from the housing 130 while another end traverses the thickness of the housing 130 to engage an electrical member disposed within the housing 130. The button 153 is sealingly engaged to the housing 130 allowing for continued airtight or watertight seal of the interior of the housing 130. In an exemplary embodiment, silicone is injected behind the button 153.

Figure 2:
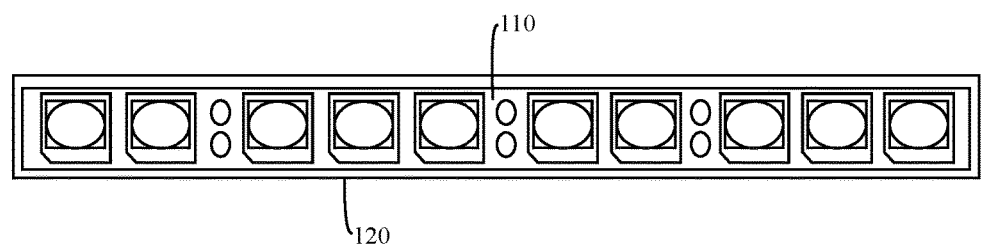
FIG. 2 shows a front elevation view of the light system, according to an embodiment of the present invention.

According to an embodiment of the present invention, FIG. 2 is a front view of the light source 110 comprising a linear strip of LED lights. The light source 110 comprises a linear strip of LED lights affixed to a backing support element 120 to maintain the orientation and to prevent the linear LED strip from stress caused during bending or stretching the light system 100.

In an embodiment, the light system 100 is electrically connected to an external power source (not shown), wherein the external power source exists within the lift truck. The electrical connectors 140, 141 may provide for a releasable connection to a length of wires 150, 151 extending from the light source 110, through the housing 130, and terminating at one or more terminals (not shown) on the power source.

In an embodiment, electrical leads 150, 151 are made of wire conductors, one for a wire in and another for a wire out. Each electrical lead 150, 151 provides for pin contacts 154 connecting the LED strip 110 to an existing power supply, or to a different lighting unit. For example, the pins 154 are installed perpendicularly through the wire leads 150, 151, thus making contact with the copper, without damaging any of the copper strands within the wire covering. In a particular embodiment, the strain relief member (not shown) houses two positive and two negative leads 150, 151 to pass into and out of a same end of the fixture. This configuration allows for easy integration with an existing light assembly (not shown) or lighting fixture (not shown) of a different type down-stream. In another embodiment, the electrical connectors 140, 141 accept a removable plug (not shown) to interface one or more electrical connections with the light system 100. In an alternative embodiment, the electrical connections structurally facilitate hardwiring of the light system 100 to an exterior power source.

In an embodiment, one or more attachment members 160 are in communication with the housing 130. In a further embodiment, the one or more attachment members are mounting buckles. The attachment members 160 receive a fastener configured to provide an attachment between the housing 130 and a substrate. The substrate is a surface to which the lighting system 100 is being mounted. For example, the substrate is a surface of a vehicle such as a lift truck. The substrate may provide a uniform plane surface to receive the light system 100 or an irregular surface requiring the housing 130 to be manipulated such that the housing 130 is shaped to a custom fit matching the contours and geometry of the substrate.

Figure 3:
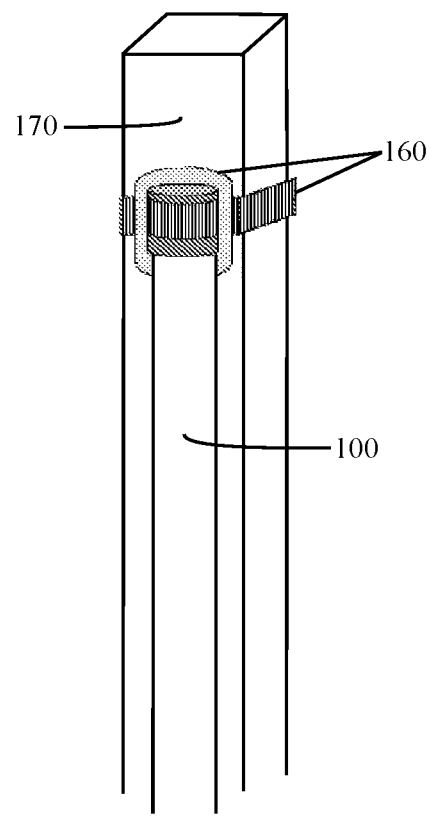
FIG. 3 shows a perspective view of the light system mounted on a front pillar of an overhead guard of a lift truck, according to an embodiment of the present invention.

FIG. 3 shows a perspective view of the light system 100 mounted on a front guard pillar 170 of overhead guard of a lift truck, according to an embodiment of the present invention. The light system 100 is removably mounted on the guard pillar 170 using one or more mounting buckles 160. The mounting buckles 160 enable removable mounting of the light system 100 on surfaces where drilling is not feasible and provide aiming options for the light system 100. The mounting buckles 160 have one or more adjustable lengths of material allowing for an adjustable distance between the mounting buckles 160 and the housing 130. The mounting buckles 160 also provide directional aiming during installation. In an embodiment, the user requires the light direction to be in a particular orientation relative to the substrate and the user then adjusts the mounting buckles 160 to accomplish a particular angle of the light emitted from the one or more light sources 110.

In use, the selectively flexible nature of the housing 130 allows it to be mounted on structures of different shape and sizes. The adaptable installation allows for specific directional aiming of the light transmission. Unlike a traditional mounting platform, the flexibility of the housing 130 allows for specific and unique aiming of the light emission. The substrate for installation is initially identified. Where the substrate is curved or has one or more angle, the housing 130 is heated, as described above, to temporarily modify the geometry. Heat is applied to the housing 130 and as the material of the housing 130 heats, it becomes less rigid and more flexible. Once the necessary flexibility of the housing 130 is achieved, the user has a limited amount of time with which to shape the housing 130 to match the desired shape such that it will provide appropriate direction of the light emission, once installed on the substrate.

In a non-limiting example, the light system 100 is mounted on front guard pillars of a lift truck. Where the light is being used to illuminate an operational directional path of the lift truck, the light is positioned such that the light will be emitted outward from the installation substrate. Where the light is used as an indicator, a predetermined location on the lift truck is identified, the housing 130 is heated and manipulated to match the installation surface, and the mounting members 160 are fastened to the lift truck in the predetermined area. In an embodiment, the housings 130 can be configured to provide light from the one or more light sources 110 in a specific direction, or omnidirectional. For example, the light source 110 may emit light in a 360-degree orientation or one or more light sources 110 may be directed by a reflective member 115 disposed within the housing 130.

In an embodiment, the light source 110 may be optionally coupled to a luminance controlling unit 185. The controlling unit 185 is programmed to automatically control the brightness of emitted light. One or more photo sensors 190 sense the environmental or ambient light or incident light and a processor 195 receives signal from photo sensor 190 based on the sensed light. Based on the interpretation of the sensed light data, the processor 195 controls and automatically adjusts an intensity of the light being emitted. In an embodiment, the processor 195 is configured to adjust the light output of the light source 110 based on a preset initial threshold. The light may be programmed to automatically adjustable intensities based on the sensed light where the user would initially set a baseline intensity for normal operation of the light. The processor 195 then appreciates the set light intensity as a baseline intensity which is manipulated automatically by the processor 195 based on the environmental, ambient, or incidental light received by the photo sensor 190. In such an embodiment, the light being emitted by the light source 110 is dynamic but perceived to be constant by individuals visually observing the light emitted. For example, when the baseline is established, the sensor 190 may sense an increased intensity of environmental light allowing for the light source intensity to be reduced. When the environmental light is decreased, the processor 195 may increase the intensity of the light source output to compensate.

In a particular embodiment, the adaptable light source intensity is constantly updated by the interaction between the sensors 190, processor 195, and the light source 110.

In another embodiment, a media storage device (not shown) is in communication with the processor 195. The media storage is configured to retain information regarding light emission presets based on an internal clock or delay. For example, the user may preset light intensities based on the time of day or time between uses.

In another embodiment, the light system 100 has a wireless communication mechanism configured to transmit and receive data with one or more remote devices (not shown). For example, the remote devices may be triggers positioned throughout a structure in which the lift truck is operating. The remote devices may transmit proximity information relative to the light system 100. When the light system 100 is found to be within a preset distance from one of the remote triggers, the light source 110 may be triggered to initiate and begin emitting light. In another embodiment, the remote device is a mobile phone allowing for selective operation of the light system 100 from a remote location. For example, a remote individual may ensure the light source 110 is turned on, and if not, they may be able to turn it on.

Figure 4:
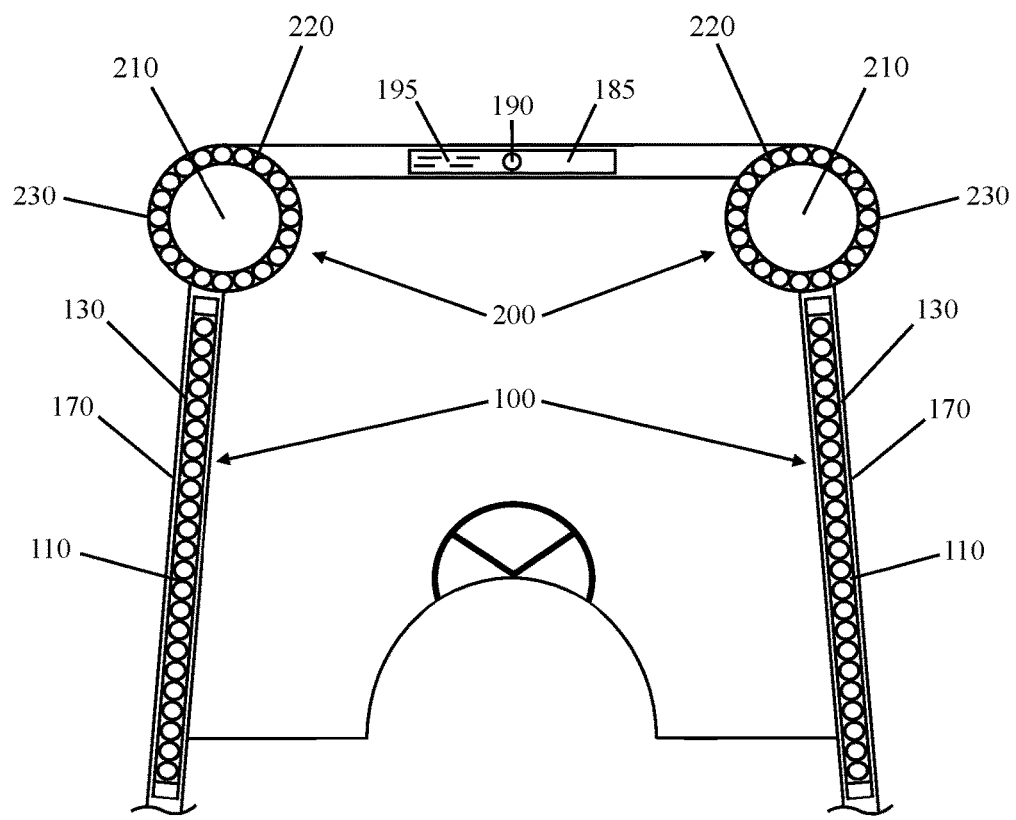
FIG. 4 shows a front elevation view of the light system mounted on a lift truck, according to an embodiment of the present invention.

According to another embodiment as shown in FIG. 4, the light system 200 includes a circular housing 230 having multiple LED or light emitting sources contained entirely therein. For example, a central light emitting source 210 may provide light or one or more wavelengths and a second light emitting source 220 may be provided around a circumference of the first light source 210. The second light source 220 may provide for a dynamic emission of light. In a specific embodiment, the second light source 220 provides for a flashing or moving light around the circumference of the first light source 210. The flashing or dynamic light provide an alert or an attractant. The second light source 220 provide great benefit over a static or even selectively adjustable intensity light source by allowing the user to deploy lighting of a lower intensity with the same ability to draw others attention to the light source for safety.

Figure 5:
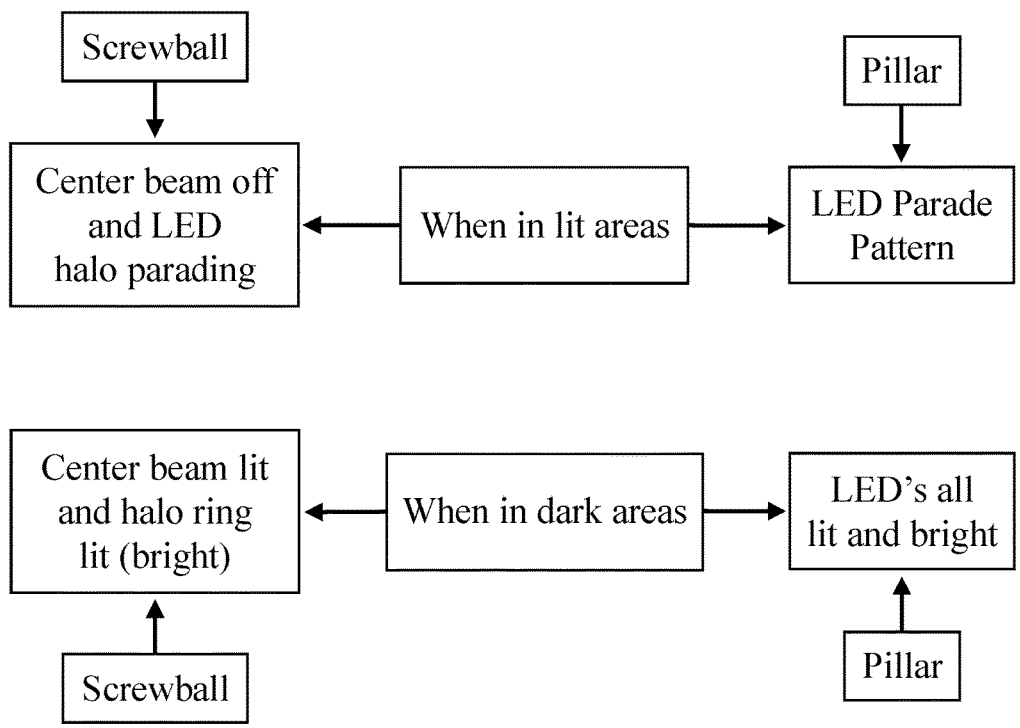
FIG. 5 is a schematic diagram of the operation of the light system, according to an embodiment of the present invention.

In an embodiment, light system 200 includes a plug receptacle for light system 100 to plug into for power. This allows light system 100 and light system 200 to operate simultaneously. FIG. 5 shows a schematic diagram that provides an exemplary mode of operation for light systems 100, 200 in lighted areas versus dark areas.

According to the preferred embodiment, light system 100 provides local and peripheral lighting; whereas, light system 200 provides distance and travel lighting. As described above, light source 110 of light system 100 is aimable in multiple directions when joined to a substrate, e.g., a lift truck pillar 170, and provides noticeability during parade mode. Light system 100 and light system 200 can be used together or independent of one another, depending on the desired goal of the user or application of use. Due to the customizable shaping of light system 100, it can be fitted, i.e., contoured to any surface, e.g., varying shapes of lift truck pillars 170.

In an embodiment, a controlling unit 185 is provided to process ambient light intensity received by the one or more photo resistant sensors 190. Ambient light is received and processed by the controlling unit 185 and then the controlling unit 185 can selectively manipulate the intensity and/or attractants provided by the light sources 110, 210, 220 within the housing 130, 230.

In an embodiment, the light system 100, 200 has a central controlling unit 185 having a plurality of ports configured to receive electrical connections from each of the housing(s) 130, 230 provided on the lift truck. For example, where the lift truck has four light housings 130, 230, each of the four housings and their respective light sources 110, 210, 220 are electrically connected the central controlling unit 185.

In another embodiment, each housing 130, 230 has a controlling unit 185 to provide selective and adaptive control to the light source 110, 210, 220 and housing 130, 230 to which it is attached.

In an alternative embodiment, each of the light sources 110, 210, 220 within the housing 130, 230 selectively displays a light of a particular wavelength. The wavelength of the light is preselected or determined based on the location of the desired substrate to which the light housing 130, 230 is attached. For example, where a remote individual desires to identify a particular lift truck, a light of a preset and known wavelength is selected for display from the light system 100, 200. The specific light is then visible and the lift truck is thereby identified.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A light system comprising one or more pillar lights, each pillar light comprising:
   a. a cylindrical, heat-moldable housing, wherein the housing is shapeable from an initial shape to a modified shape using heat treatment, wherein, upon cooling, the housing retains the modified shape;
   b. an end cap having a first end in communication with a first end of the housing;
   c. a pair of inbound electrical leads for receiving electrical transmissions, wherein a proximal end of each of the inbound leads passes into the end cap through a distal end of the end cap, and wherein a distal end of each of the inbound leads is coupled to a first electrical connector disposed outside of the pillar light;
   d. a pair of outbound electrical leads for dispatching electrical transmissions, wherein a proximal end of each of the outbound leads passes into the end cap through the distal end of the end cap, and wherein a distal end of each of the outbound leads is coupled to a second electrical connector disposed outside of the pillar light;
   e. a light source including a plurality of linearly-aligned lights disposed within the housing, wherein the light source is in electrical communication with the proximal end of each of the inbound electrical leads and the outbound electrical leads;
   f. one or more filter layers configured to control transmission of light from the light source through the housing;
   g. a lens disposed within the housing, wherein a refractive index of the lens is different than a refractive index of the housing;

h. a reflective member disposed within the housing, wherein the lens and the reflective member direct light emitted from the light source in a specific direction; and
i. a plurality of attachment members, each attachment member comprising:
   i. a buckle; and
   ii. an adjustable length of material.

2. The light system of claim 1, further comprising one or more controlling units including:
   a. a photo resistor sensor; and
   b. at least one processor in electrical communication with the photo resistor sensor,
   wherein the one or more pillar lights are electrically connected to the one or more controlling units.

3. The light system of claim 1, further comprising one or more screwball lights in electrical communication with the one or more pillar lights, each screwball light comprising:
   a. a center beam light; and
   b. a ring of lights disposed within a housing that is circumferentially engaged to the center beam light,
   wherein an intensity of the center beam light is greater than an intensity of the ring of lights, and wherein the ring of lights provides a dynamic emission of light.

4. The light system of claim 3, further comprising one or more controlling units including:
   a. a photo resistor sensor; and
   b. at least one processor in electrical communication with the photo resistor sensor,
   wherein the one or more pillar lights and the one or more screwball lights are electrically connected to the one or more controlling units.

5. The light system of claim 4, wherein, if the photo resistor sensor detects a pre-determined amount of light, an operation of the light system comprises the steps of:
   a. the processor instructing the one or more pillar lights to operate in a parade pattern;
   b. the processor instructing the center beam light to shut off; and
   c. the processor instructing the ring of lights to operate in a parade pattern, and wherein, if the photo resistor sensor does not detect a pre-determined amount of light, an operation of the light system comprises the steps of:
   a. the processor instructing the one or more pillar lights to be brightly lit;
   b. the processor instructing the center beam light to turn on; and
   c. the processor instructing the ring of lights to be brightly lit.

6. The light system of claim 3, further comprising:
   a. a wireless communication module in communication with the light system; and
   b. one or more remote devices in communication with the wireless module.

7. The light system of claim 6, wherein the one or more remote devices are configured to transmit proximity information relative to the light system, wherein, when the light system is within a pre-determined distance from a remote trigger, the light system is powered on.

8. The light system of claim 6, wherein the light system is remotely operable using the one or more remote devices.

9. The light system of claim 8, wherein the one or more remote devices comprises a mobile phone.

10. A light system comprising one or more screwball lights, each screwball light comprising:
    a. a center beam light; and
    b. a ring of lights disposed within a housing that is circumferentially engaged to the center beam light,
    wherein an intensity of the center beam light is greater than an intensity of the ring of lights, and wherein the ring of lights provides a dynamic emission of light.

11. The light system of claim 10, further comprising one or more controlling units including:
    a. a photo resistor sensor; and
    b. at least one processor in electrical communication with the photo resistor sensor,
    wherein the one or more screwball lights are electrically connected to the one or more controlling units.

12. The light system of claim 11, wherein, if the photo resistor sensor detects a pre-determined amount of light, an operation of the light system comprises the steps of:
    a. the processor instructing the center beam light to shut off; and
    b. the processor instructing the ring of lights to operate in a parade pattern, and wherein, if the photo resistor sensor does not detect a pre-determined amount of light, an operation of the light system comprises the steps of:
    a. the processor instructing the center beam light to turn on; and
    b. the processor instructing the ring of lights to be brightly lit.

13. The light system of claim 10, further comprising:
    a. a wireless communication module in communication with the light system; and
    b. one or more remote devices in communication with the wireless module.

14. The light system of claim 13, wherein the one or more remote devices are configured to transmit proximity information relative to the light system, wherein, when the light system is within a pre-determined distance from a remote trigger, the light system is powered on.

15. The light system of claim 13, wherein the light system is remotely operable using the one or more remote devices.

16. The light system of claim 15, wherein the one or more remote devices comprises a mobile phone.

* * * * *